Sept. 3, 1963 F. A. SCHULTZ ETAL 3,102,328

METHOD OF PACKAGING AND INTERCONNECTING CIRCUIT COMPONENTS

Original Filed Dec. 31, 1957 5 Sheets-Sheet 1

INVENTORS
FREDERICK A. SCHULTZ
NEWTON G. NOELL
BY [signature]
ATTORNEY

Sept. 3, 1963 F. A. SCHULTZ ETAL 3,102,328

METHOD OF PACKAGING AND INTERCONNECTING CIRCUIT COMPONENTS

Original Filed Dec. 31, 1957 5 Sheets-Sheet 3

METHOD OF PACKAGING AND INTERCONNECTING CIRCUIT COMPONENTS

Original Filed Dec. 31, 1957

United States Patent Office 3,102,328

Patented Sept. 3, 1963

3,102,328

METHOD OF PACKAGING AND INTERCONNECTING CIRCUIT COMPONENTS

Frederick A. Schultz and Newton G. Noell, Poughkeepsie, N.Y., assignors to International Business Machines Corporation, New York, N.Y., a corporation of New York Original application Dec. 31, 1957, Ser. No. 706,360. Divided and this application Aug. 28, 1959, Ser. No. 836,667

3 Claims. (Cl. 29—155.5)

This invention relates to a method for interconnecting electric components. In its specific aspect, the invention relates to the packaging of magnetic cores to form magnetic core memory planes. This is a division of our application Serial Number 706,360, filed December 31, 1957.

Magnetic cores of ferrite or like materials find extensive use in electronic computers and in automatic data processing systems as a means for storing information. Such cores are interconnected into a matrix by means of wires, including driving and sensing wires, such that the magnetic state of a selected core or cores can be altered to indicate the presence of a bit of information which can be sensed whenever required. Heretofore such cores have been fashioned into planes for installation as required by manually threading the necessary interconnecting control wires through the cores according to a prescribed configuration.

The manual fabrication of core planes imposes no particular hardship if the cores utilized are large enough for easy handling, as was the case with the relatively large toroid cores employed in the past. Cores today, however, are of such minute dimensions that their manual fabrication into memory planes poses serious problems, both as to the amount of time that is required for such fabrication and as to the technical perfection with which the work can be done by hand. These difficulties can be appreciated upon consideration of the size of a typical 3-hole core presently in use which is only .1000 of an inch long, .07000 of an inch wide, .0200 of an inch in thickness, and contains three transverse control wire-receiving holes, each having a diameter of .0200 of an inch.

It is, therefore, the principal object of this invention to assemble small electrical components into an interconnected electrical system by a method which eliminates the manual handling of the components, and in its preferred form, also of the interconnecting conductors.

It is a specific object of the invention to interconnect magnetic cores into a matrix by a method which eliminates the manual handling and manipulation of the cores and their interconnecting control wires.

It is a further object of the invention to provide a core plane fabricating method which makes use of a rigid core panel having core sockets in a face thereof for receiving cores, a closure for the open mouth of the sockets, and aligned transverse passages through the closures, cores and sockets such that core control wires can be disposed in the transverse passages and on opposite faces of the panel without further handling of the cores.

It is a still further object of the invention to provide a magnetic core plane fabricating method which employs a preformed matrix board containing cores of a core plane and in which the several control wires for the plane are electro-chemically formed.

It is yet another object of the invention to teach a method for the manufacturing of magnetic core memory planes by the use of a matrix board having core receiving cavities therein in conjunction with certain method steps resulting in the inter-weaving of core control wires by electro-chemical action.

The method objectives of the invention are attained by resort to printed wire techniques whereby interconnections between a plurality of cores are formed by depositing conducting metals on a core matrix base and through wire-receiving holes of a plurality of cores comprising a core memory plane.

Briefly, the ultimate structure resulting from the method herein consists of a magnetic core plane in unitary or package form composed of a preformed matrix board having cores located in cavities in the face of the board and having the necessary interconnecting conductors electro-chemically formed on the opposite faces of the board and through the cores and board in a predetermined configuration to form a magnetic memory plane.

The method aspects of the invention for the production of a magnetic core plane, as defined, contemplate the use of a molded matrix board having core cavities in the face of the board to hold the cores in their ultimate position within the plane. The bottom of each core cavity has a plurality of transverse holes which comprise circuit defining channels extending to the back of the board. Both the face and the back of the board are grooved to form additional circuit defining channels of which predetermined face channels interconnect with predetermined back channels by way of the transverse holes in the bottom of the appropriate core cavities.

A magnetic core is then placed into each one of the core cavities, and such cores will ordinarily have transverse holes corresponding in number and location to the transverse holes in the bottom of the core cavities. After the cores have been so placed, a preformed plug is inserted into the open mouth of each core cavity such that each core is contained between the bottom of its cavity and the inserted plug above it. The face of the plugs is formed to constitute continuations of the face channels of the board wherever necessary and with transverse holes corresponding in number and location to the transverse holes in the base of the cavities. The assembly, as described, will, therefore, provide the necessary circuit channels interwoven through the cores to provide for control wires connecting the cores into a matrix having the desired circuit configuration.

The assembly comprising the matrix board, the cores, and the plugs is then subjected to a spraying or dipping operation whereby the interstices or gaps between the components are bridged, and a conductor metal binding surface is formed on the exposed portions of the assembly, particularly in the conductor defining channels. The assembly is now conditioned to receive the control wire by which the cores are interconnected. This operation may be performed manually, but it is preferably done by the following electro-chemical process.

A thin film of metal is first deposited on the adhesively conditioned assembly to provide electrical continuity between the top and the bottom and through the holes. This is done preferably by subjecting the assembly to vaporized copper within a vacuum. After a thin coating of copper has been formed on the exposed surfaces of the assembly, a more substantial layer of copper is electro-plated thereon to a thickness sufficient to form the ultimate connecting conductors. Finally, the plating on the surfaces of the matrix board is ground or sanded until only the metal in the conductor channels remains. The resulting structure is a unitary core memory plane in the form of a self-sustaining package.

The stated objects and further objectives and advantages of the invention will appear from the following specific description when read in light of the drawings, forming a part of this application, and in which drawings.

The invention herein can be usefully employed in the construction of magnetic core memory planes of various sizes and with cores falling within a wide range of design. A 3-hole core, such as that shown in FIG. 1, and a small core plane utilizing such cores has been adopted as the main vehicle for explaining the invention. It may be presumed that the dimensions of the core 10 of FIG. 1 correspond generally to the dimensions previously stated. The magnetic state of a core, as stated, can be controlled by means of wires threaded through the core in accordance with a particular configuration. Accordingly, FIG. 1 also illustrates a pair of core driving wires X and Y which are threaded through the central hole 12 of the core, a sensing wire which is threaded through the hole 14 and an inhibiting wire I which is threaded through the hole 16. The control wires of FIG. 1 and their relation to the core as shown in that figure are also exemplary only.

Figure 2:
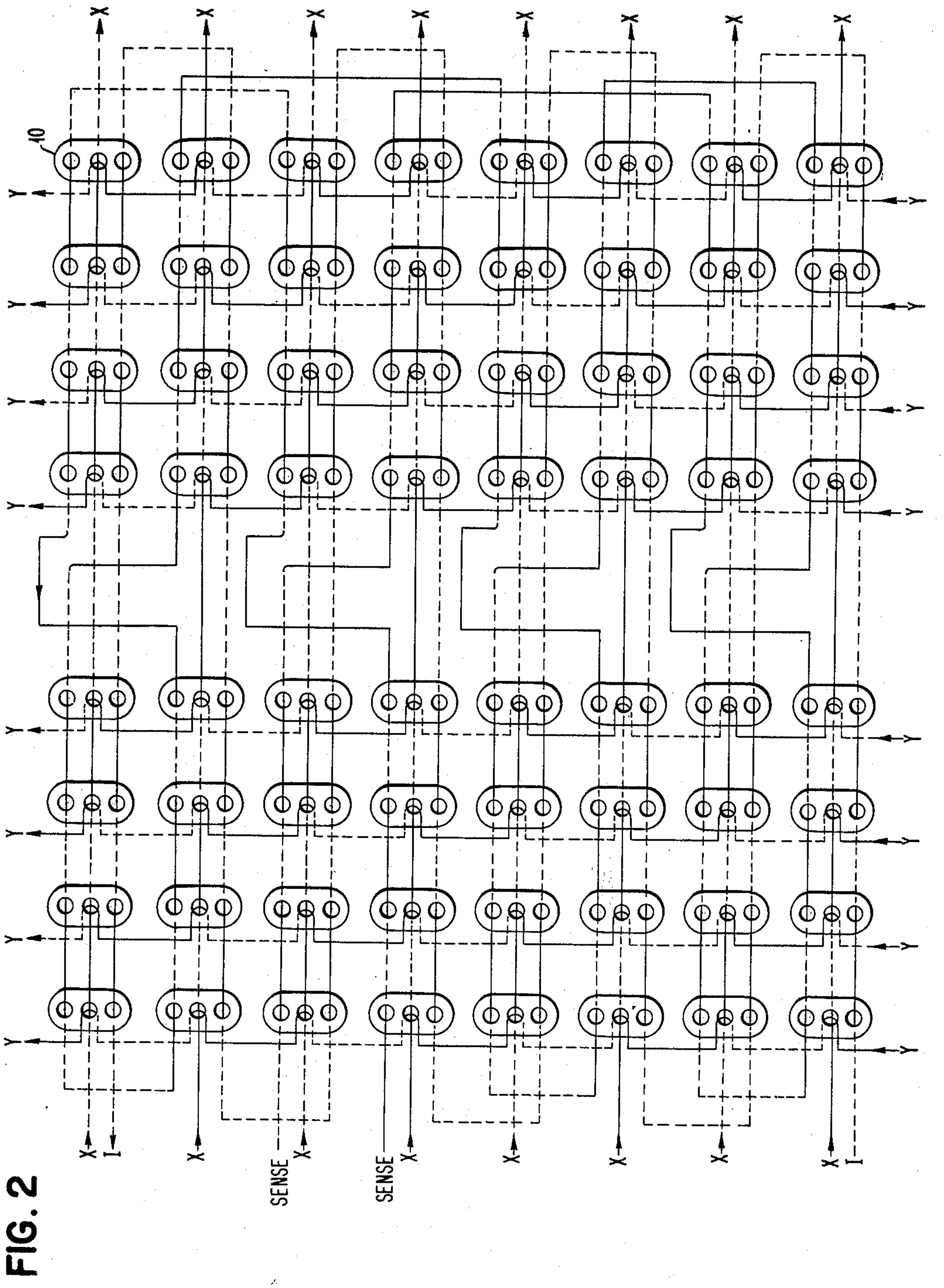
FIG. 2 represents a plurality of ferrite cores such as shown in FIG. 1 which are interconnected into a matrix by means of a plurality of control wires.

FIG. 2 illustrates an 8 x 8 core matrix, by way of example, in which the cores 10 are interconnected in operative manner by means of driving wires X and Y, sensing wires S and inhibiting wires I. In the matrix of FIG. 2, the horizontal rows of cores are interconnected by means of individual driving wires X, while the vertical columns of cores are interconnected by individual driving wires Y. Driving current on an X and Y wire will alter the state of the core 10 at the intersection of such wires. The state of cores can be sensed on the sensing wires S and the core state can be controlled through the inhibiting wires I. A consideration of the foregoing is of importance herein only to the extent that it may be necessary to the construction of a matrix board utilized in the method by which the core planes are constructed.

Figure 3:
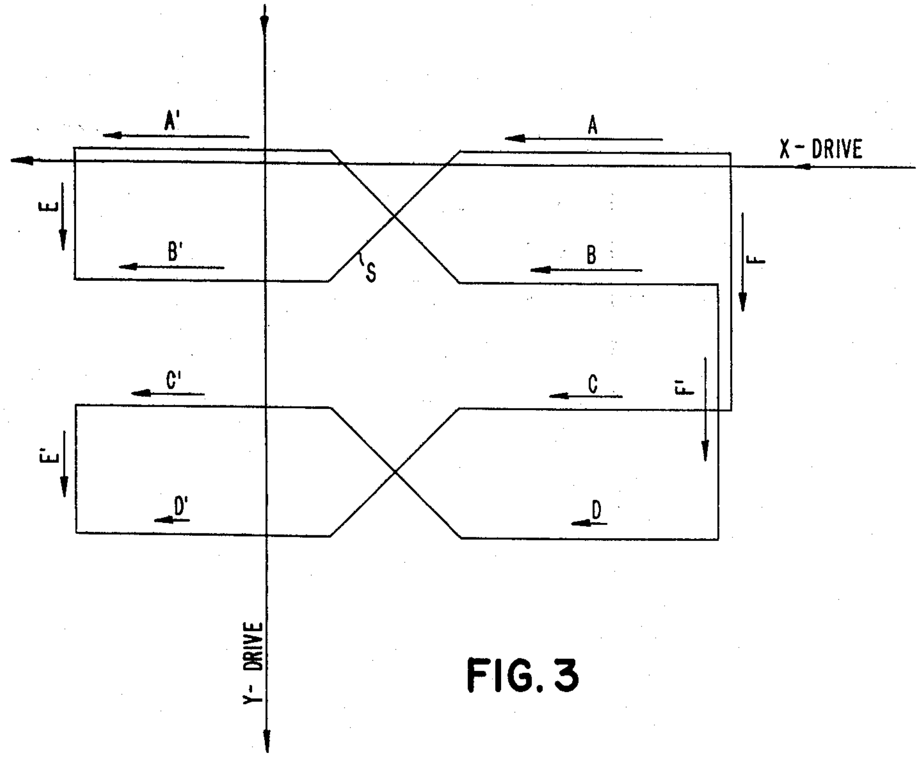
FIG. 3 is a diagrammatic representation of the relationship of core controlled wires for obtaining electrically balanced matrix conditions.

FIG. 3 diagrammatically illustrates considerations entering into the design of a matrix board adapted to the method herein. In FIG. 3 a pair of core driving wires X and Y respectively are shown disposed at right angles to each other and in relation to a sensing wire. If current is passed through the driving wire X, voltages A, A'; B, B'; C, C'; and D, D' will be induced. A will equal A'; B will equal B'; C will equal C'; and D will equal D', since they are respectively the same distance from the driving wire X and are of the same length. The sensing wires S are wound such that A opposes A'; B opposes B'; C opposes C'; and D opposes D'. The net effect of noise induced by the driving wire will be zero. It can also be seen that the voltages E and E', and F and F', induced by the driving wire Y, will cancel each other. With the foregoing general considerations in mind, reference will now be made to the mechanical and electrochemical aspects of the invention.

A core holding matrix board 18 (FIG. 4) is molded in light of the foregoing design considerations such that an electrically balanced winding configuration is produced with a minimum number of conductors extending from one side of the matrix board to the other. The selected wiring pattern controls the vertical and lateral spacing of core receiving and holding sockets 20.

Figure 1:
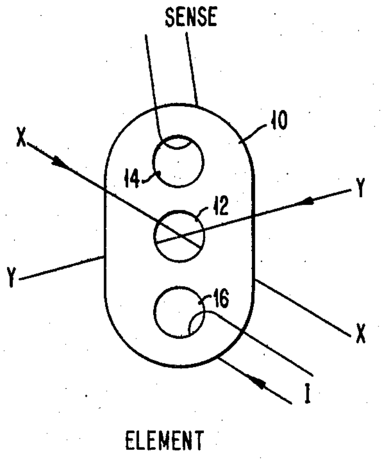
FIG. 1 represents a ferrite core having 3 holes for receiving control wires.
Figure 4:
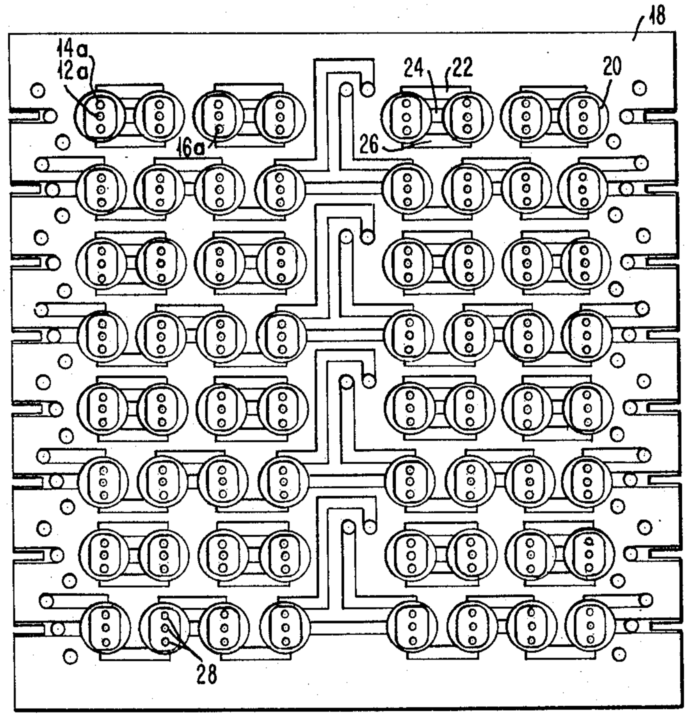
FIG. 4 is a face view of a matrix board.

In FIG. 4, the matrix board 18 is molded such that a plurality of core sockets 20 are formed in the face thereof. The face of the board 18 has formed therein grooves 22 interconnecting adjacent pairs of the core sockets 20 such that sensing conductors can be formed in such grooves. By the same token, pairs of adjacent core sockets are interconnected by grooves 24 such that a core driving conductor can be formed therein. Finally, the same adjacent pairs of core sockets are inter-connected by grooves 26 such that an inhibiting or biasing conductor can be formed therein. Each of the core sockets 20 has formed in the base thereof three holes 28 corresponding to the holes 12–16 of the core (FIG. 1). In FIG. 4, the identity between the core holes 12–16 and the holes in the base of the core sockets 20 through which the sensing conductor, the core driving conductor and the inhibiting or biasing conductor, respectively, are to be formed is indicated by the reference numerals 12*a*, 14*a* and 16*a*.

Figure 5:
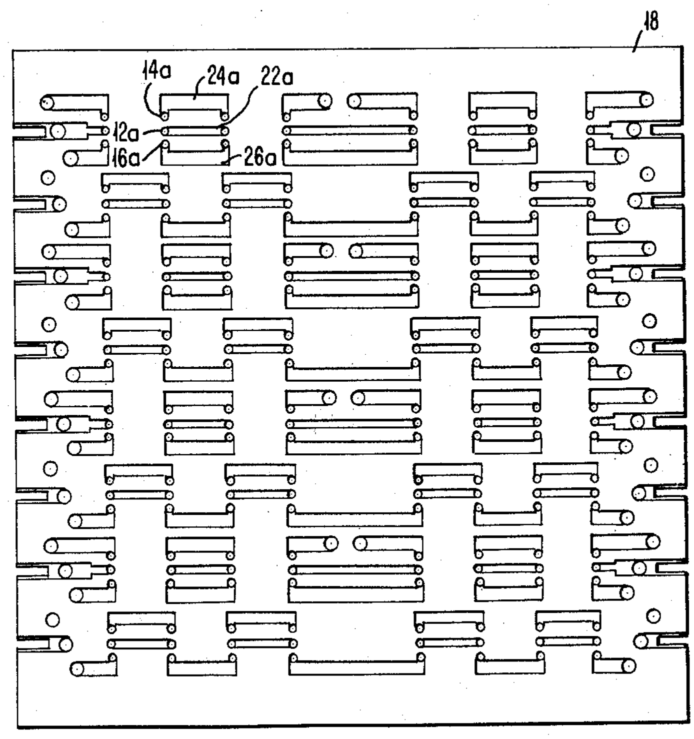
FIG. 5 is a back view of the matrix board of FIG. 4.

The back of the matrix board 18 has formed therein a series of generally parallel grooves 22*a*, 24*a* and 26*a* communicating respectively with the holes 12*a*, 14*a* and 16*a* in the base of adjacent pairs of core sockets. The configuration of the grooves in the face of the matrix board, as shown in FIG. 4, and those in the back of the matrix board, as shown in FIG. 5, will be apparent from a consideration of the wiring configuration shown in the memory plane of FIG. 2. In FIG. 2, the solid lines correspond to the interconnecting grooves in the face of the matrix board of FIG. 4, while the dotted lines correspond to the grooves in the back of the matrix board shown in FIG. 5.

Figure 6:
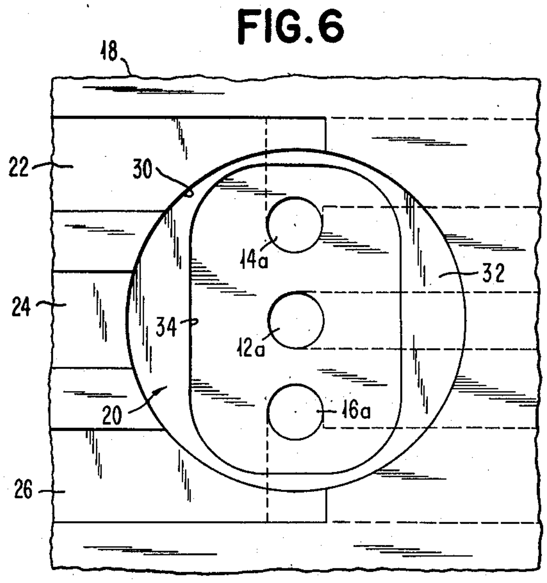
FIG. 6 is an enlarged view of a one bit section of the matrix board shown in FIG. 4.
Figure 7:
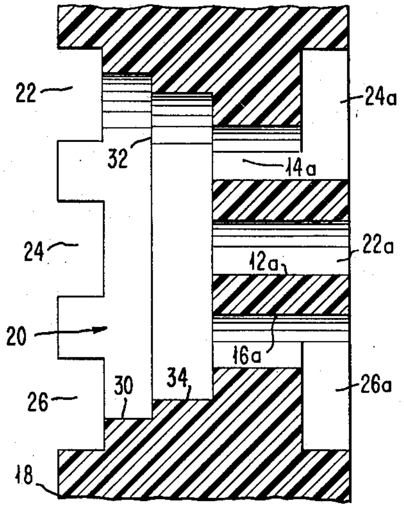
FIG. 7 is a sectional view on lines 7—7 of FIG. 6.

Reference to FIGS. 6 and 7 will more fully disclose the nature of each of the core sockets 20 formed in the face of the matrix board 18. Each socket is defined by a wall 30 which terminates in an internal shoulder 32. The area 34 of the socket below the shoulder is formed in shape and size to correspond to the external outline of the core 10. The depth of the countersunk portion is such that it will accommodate the thickness of the core 10. As shown in FIG. 7, the passages 12*a*, 14*a* and 16*a* formed in the bottom of the core cavity 20 correspond to the position of the holes in the core such that when a core is placed into one of the cavities, the holes of the core and those in the bottom of the cavity will register.

Figure 8:
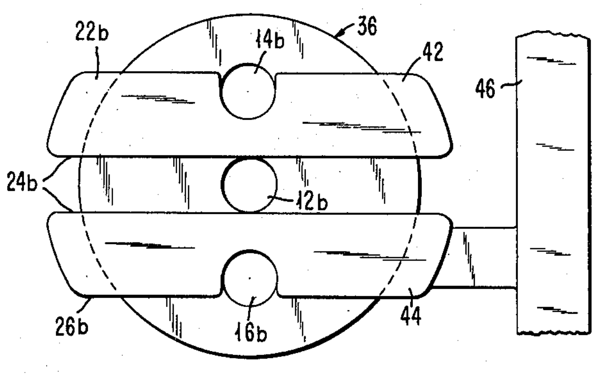
FIG. 8 is an enlarged view of a plug employed with the matrix board of FIG. 4.
Figure 9:
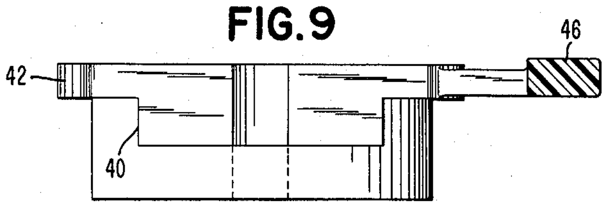
FIG. 9 is a sectional view of the plug on line 9—9 of FIG. 8.
Figure 10:
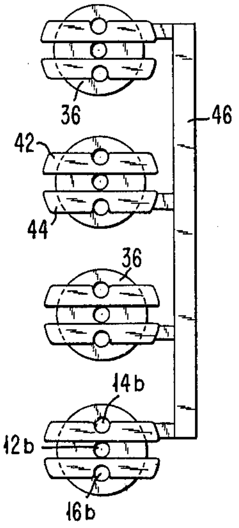
FIG. 10 is a plan view of four mechanically interconnected plugs of the kind shown in FIG. 8.

Each core socket 20 is adapted to receive and snugly engage a plug 36 such as shown in FIGS. 8 through 10. The plug 36 has a base portion 40 which is adapted to enter the core socket 20 and seat on the shoulder 32. As best shown in FIG. 8, the plug has a plurality of holes 12*b*, 14*b* and 16*b* corresponding respectively to the position of the holes 12, 14 and 16 of the core member 10. Consequently, when a core in a core socket is covered by a plug, the holes in the three elements, i.e., the plug, the core and the bottom of the core socket, will be in proper alignment. The relationship of core socket, core, and plug is shown in the exploded view of FIG. 11.

Ribs 42 and 44 formed on the face of the plug 36 present respective edge surfaces 22*b*, 24*b*, and 26*b*, constituting continuations of the grooves 22, 24 and 26 in the face of the matrix board. The ends of the ribs 42 and 44 extend beyond the base of the plug such that they bridge the gap between the plug and the matrix board when the plugs are inserted into the sockets. Thus, intercommunicating channels defining a circuit configuration for the interconnection of cores into a memory plane have been provided.

It is contemplated that the plugs 36 be temporarily interconnected into sets of four or more during the molding thereof by means of a bar 46, as shown in FIG. 10. This expedient is employed for the purpose of facilitating placement of the plugs into the respective core sockets. Closure of the core sockets can also be facilitated by employing a closure plate which is coextensive in outline with the matrix board. According to this suggestion, the matrix board has a smooth face except for the core sockets and the closure plate has the conductor channels in the face thereof as well as the aligned transverse holes.

By reference to FIG. 5, it will be seen that the transverse holes through the matrix board 18 within the core sockets communicate with grooves in the back of the matrix board and with the corresponding transverse holes of an adjacent core socket. Thus, the transverse holes 12*a*, 14*a* and 16*a* communicate with the grooves 22*a*, 24*a* and 26*a* respectively, which grooves in turn communicate with the corresponding transverse holes of an adjacent core socket.

From the foregoing, it can be seen that a continuous conductor defining channel is provided on the face of the matrix board 18, through the plug 36, through the base of the matrix board and to the back of the matrix board. For example, a channel for the sensing wire comprises the face groove 22 (FIG. 4), the plug hole 14*b*, the matrix board hole 14*a* and the groove 24*a* in the back of the matrix board, which groove leads to a corresponding transverse hole of an adjacent core socket such that the pattern can be repeated. By the same token, a driving wire channel is provided by the groove 24 in the face of the board, the transverse hole 12*b* in the plug 36, the hole 12*a* through the back of the matrix board and the groove 22*a* in the back of the matrix board, which groove communicates with a corresponding transverse hole of an adjacent core socket such that the pattern can be repeated. Finally, a conductor defining channel is formed for an inhibiting wire, for example, which includes the groove 26 in the face of the matrix board, the transverse hole 16*b* in the plug 36, the transverse hole 16*a* through the back of the matrix board and the groove 26*a* in the back of the board, which groove communicates with the corresponding hole of an adjacent core socket such that the pattern can be repeated.

The matrix board 18 and the plugs 36 are molded to precise dimensions preferably using suitable styrene molding compounds. These compounds may be either thermoplastic or thermosetting in their nature. One such compound that has been employed is a rubber modified styrene-acrylonitrile copolymer molding plastic manufactured and sold by Dow Chemical Company under the identifying title of "767." A thermosetting epoxy molding compound is suitable for the purpose.

With a matrix board and its plugs molded and provided as described above, the method by which cores are connected into a memory plane is as follows: Cores such as the core 10 of FIG. 1 are inserted into the core sockets 20 such that each socket contains a core. This operation can be performed with convenience by vibrating the matrix board 18 after a core has been dropped into each socket or an adequate number of cores have been placed on the horizontally disposed face of the matrix board, such that the cores will seat themselves in the countersunken portion of the sockets. After the cores are in place in the sockets of the matrix board, the plugs 36 are placed within the core sockets such that the plugs overlie the cores in close proximity. After the plugs have been thus placed, the bar 46 which holds a plurality of these plugs together in properly spaced relationship is clipped off.

It is next necessary to close any crevices between the plugs and the face of the matrix board and particularly such crevices as may exist between the inner end of the plugs and the cores or between the cores and the bottom of the core sockets. A satisfactory method for closing these crevices makes use of a dilute adhesive. The adhesive selected should serve as a conductor bonding agent, it should seal all the gaps between the elements of the assembly without plugging the holes in the plugs, cores or matrix board, and it should possess drying and curing properties that will not be disturbed by subsequent vacuum metallizing and electro-plating operations.

In one successful practice of the method, use was made of a buna N type thermosetting adhesive which was diluted by using an appropriate solvent. Specifically, use was made of an Armstrong Cork Company Type N 178 adhesive consisting of 45% phenolic resin, 45% butadiene-acrylonitrile and 10% epoxy resin. This adhesive was diluted by adding 7 parts of methyl ethyl ketone to 1 part adhesive by weight. The assembled matrix board was dipped into the adhesive and a blast of compressed air was used immediately after the dipping operation in order to remove any adhesive which tended to block the holes through the plugs, cores and the matrix board. Thereafter the treated assembly was dried. The drying step may be performed by air drying the dipped assembly at room temperature for a period of time, say 30 minutes, and then oven drying the same at approximately 150° F. for a further period of 30 minutes, for example.

The assembly thus treated with the adhesive is now conditioned to receive the interconnecting control wires which, according to the preferred practice of the invention, are formed by electro-chemical methods. If an electro-plating process is to be employed, it is necessary to form a continuous conducting surface for the areas to be plated and since the holes through the plugs, cores and matrix board are very small, it is appropriate to first vacuum metallize the assembly such that a plating operation can be performed at a subsequent stage of the method. Accordingly, the assemblies to be metallized may be placed in a vacuum chamber and subjected to the vapor of a conductive metal whereby a thin coating of such metal is metallized onto the assembly, including the transverse holes through the plugs, the cores and the base of the matrix board. In one successful practice of the method, an assembly was held stationary at a distance of seven inches above the source of copper vapor, the top surface of the assembly was covered with a phenolic covering plate during the metallizing operating. Two grams of copper were vaporized by subjecting it to 300 amperes for two minutes while the assembly was held in a chamber having imposed thereon a vacuum of less than 0.5 micron. The assembly was then reversed and subjected to a similar metallizing operation to deposit a thin coating of copper on the opposite face thereof. The metallized coating so produced was in the order of .000007 of an inch in thickness, and this coating appeared to be applied with uniformity over the exposed surfaces of the assembly, including the walls of the transverse holes.

Having now conditioned the assembly for the build-up of the interconnecting conductors, the assembly is subjected to the further deposition of metal. One convenient way of building up the metal deposit is by copper plating. In the particular practice of the method being described, the vacuum metallized assembly was put into a pyrophosphate copper plating bath held at a temperature between 120° F. and 130° F. and having a pH level of 8.5. The initial plating stage proceeded for about 10 minutes at 12 amperes per square foot of surface to be plated after which the current was raised to 50 amperes per square foot of surface and the plating operation was continued for 1½ hours. This resulted in a copper plated thickness of approximately .003 of an inch.

Subsequently, the assembly so processed is ground to remove excess metal from the parts by means of a surface grinder or disc sander. The grinding operation is continued until metal remains only in the grooves defining the circuit configuration.

If desired, the assembly may be tin-lead plated after grinding to form surfaces to which soldered connections can be made more readily. A tin-lead coating also inhibits the oxidation of the copper plating. In such case, the tin-lead plating is preferably conducted at a plating bath temperature of 80° F. and at 50 amperes per square foot of surface to be plated.

The details of the invention have been illustrated and stated in reference to the formation of a core plane utilizing magnetic cores having three holes. The invention, as previously stated, is equally applicable to the formation of core planes utilizing cores of different design, as, for example, the cores shown in FIG. 12.

Figures 11, 12, 13:
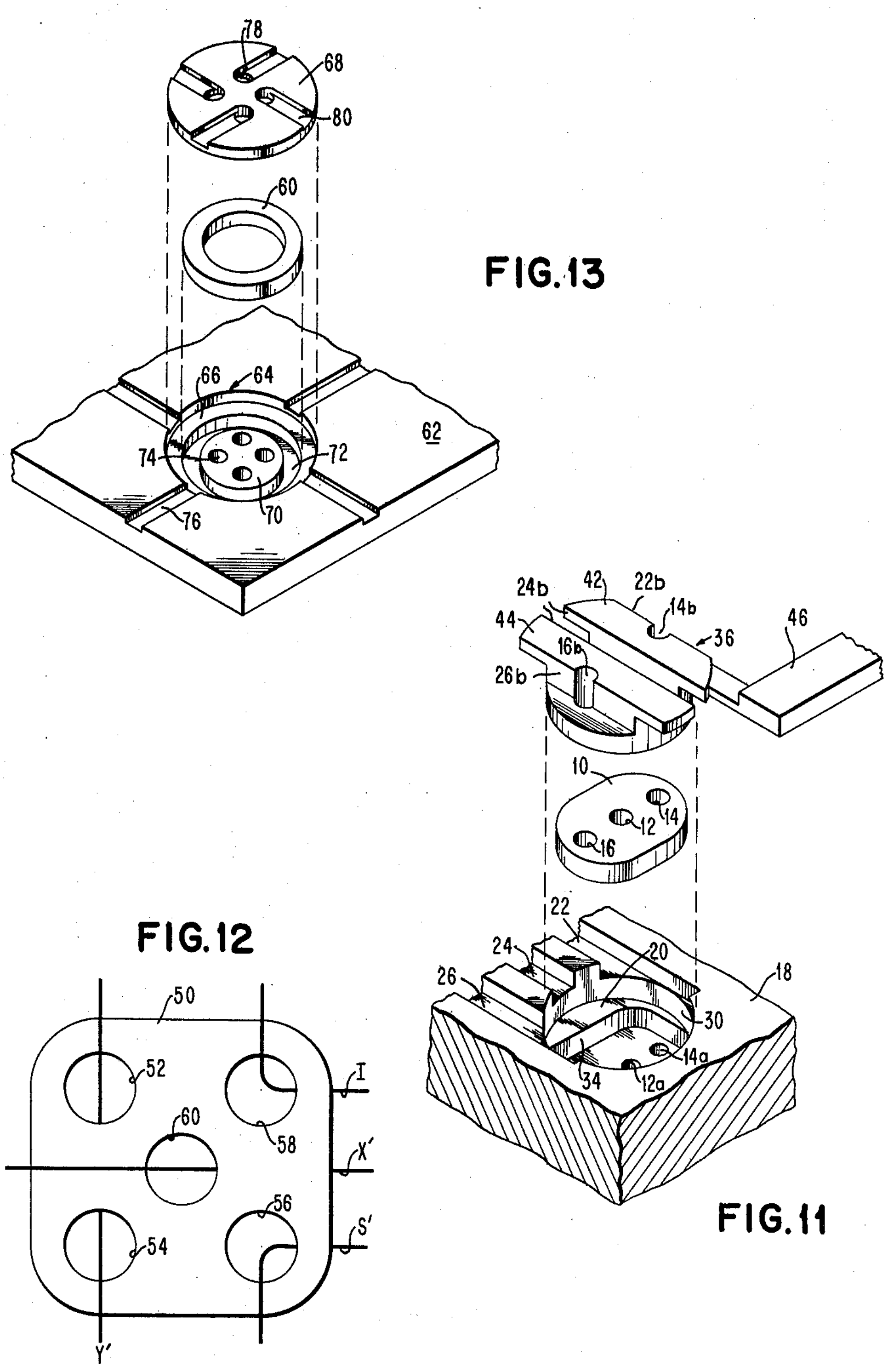
FIG. 11 is an exploded view of a one bit section of a core plane.
FIG. 12 is a magnetic core of a modified structure showing the configuration of the control wires utilized in respect thereto.
FIG. 13 is an exploded view of a one bit section of a core plane, showing the invention adapted to the utilization of toroidal cores.

FIG. 12 illustrates a core 50 having five holes 52, 54, 56, 58 and 60 therein. The core shown in FIG. 12 is flat and has a generally square configuration with the corners rounded. Cores such as that shown in FIG. 12 require a single control wire in each of the core holes with the result that cores of this type would be well adapted for use in the method herein described. A driving wire Y' is threaded through core holes 52 and 54, a second driving wire X' is threaded through the hole 60, a sensing wire S' is threaded through the hole 56 while an inhibiting wire I is threaded through the hole 58. The necessary matrix board to accommodate cores of the form shown in FIG. 12 can be designed in accordance with the design considerations hereinabove stated, such that an electrically balanced matrix would result; the core sockets being altered to the shape of the cores and the conductor channel grooves on both the face and back of the matrix board being altered as required to produce the control wire configuration for cores of this design.

A simple modification of the described technique adapts the invention to the utilization of toroidal cores. FIG. 13 is an exploded view of a one bit section of a core plane which has been modified to utilize cores 61 of the toroidal type. In FIG. 13, the matrix board 62 has formed therein a socket 64 having a shoulder 66 adapted to support a plug 68. Located centrally within the socket is an upstanding boss 70 which, together with the shoulder 66, defines an annular recess 72 adapted to receive and seat the core 61.

The boss 70 has formed therein a plurality of holes 74 which extend through the back of the panel 62. These holes are in alignment with respective face channels 76 and with suitable corresponding channels in the back of the board. The plug 68 has corresponding holes 78 extending therethrough such that when the core and plug are assembled, the holes 78 of the plug will register with the holes 74 in the boss 70. Face channels 80 in the plug 68 communicate with the holes 78 and are so disposed as to form continuations of the channels 76 in the face of the panel 62. It can be seen, therefore, that in principle the same technique used in respect to multi-hole cores is also applicable to toroidal cores since the boss 70 provides mutually isolated paths for a plurality of core windings such that the interconnecting wires for a plurality of cores can be formed in accordance with the method herein described.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. The method of packaging an array of multi-channel magnetic cores to form a magnetic core memory plane which comprises the steps of forming in the face of a rigid core supporting panel having plane substantially parallel face and back surfaces spaced from each other to provide a plane thickness in excess of the thickness of the cores to be packaged therein a plurality of spaced non-circular core-enclosing sockets terminating in a mouth at the face of said panel, forming core- connector passages through the bottom wall of each of said sockets, forming core connector patterns on the back surface of said panel interconnecting socket passages of selected pairs of sockets, forming core connector patterns on the facial surface of said panel which terminate at the mouth of selected pairs of sockets, inserting in each of said sockets a non-circular core corresponding in size and outline to the shape of said non-circular sockets and having a plurality of core connector channels therethrough corresponding in position to said respective socket passages, inserting into the open mouth of said sockets one of a plurality of aligned plugs of rigid material and having in each thereof through connector passages in registration with the connector passages in said cores and having core connector patterns on the exposed face thereof in communication with selected ones of the connector patterns on the face of said panel, and forming a coating of conductive material on the face and back connector patterns of said panel and directly in the aligned passages of said cores, plugs and sockets.

2. The method of packaging an array of multi-channel magnetic cores to form a magnetic core memory plane which comprises the steps of forming in the face of a rigid core supporting panel having plane substantially parallel face and back surfaces spaced from each other to provide a plane thickness in excess of the thickness of the cores to be packaged therein a plurality of spaced non-circular core-enclosing sockets terminating in a mouth at the face of said panel, forming core-connector passages through the bottom wall of each of said sockets, forming core connector patterns on the back surface of said panel interconnecting socket pasages of selected pairs of sockets, forming core connector patterns on the facial surface of said panel which terminate in the shouldered mouth of selected pairs of sockets, inserting in each of said sockets a non-circular core corresponding in size and outline to the shape of said non-circular sockets and having a plurality of core connector channels therethrough corresponding in position to said respective socket passages, inserting into the open mouth of said sockets one of a plurality of aligned rigidly interconnected plugs of rigid material and having in each thereof through-connector passages in registration with the connector passages in said cores and having core connector patterns in the exposed face thereof in communication with selected ones of the connector patterns on the face of said panel, and forming a continuous coating of conductive material on the face and back connector patterns of said panel and directly in the aligned passages of said cores, plugs and sockets.

3. The method of packaging an array of multi-channel magnetic cores to form a magnetic core memory plane which comprises the steps of forming in the face of a rigid core supporting panel having plane substantially parallel face and back surfaces spaced from each other to provide a plane thickness in excess of the thickness of the cores to be packaged therein a plurality of spaced non-circular core-enclosing sockets terminating in a circular internally shouldered mouth at the face of said panel, forming core-connector passages through the bottom wall of each of said sockets, forming core connector patterns on the back surface of said panel interconnecting socket passages of selected pairs of sockets, forming core connector patterns on the facial surface of said panel which terminate in the shouldered mouth of selected pairs of sockets, inserting in each of said sockets a non-circular core corresponding in size and outline to the shape of said non-circular sockets and having a plurality of core connector channels therethrough corresponding in position to said respective socket passages, inserting into the open mouth of said sockets and into contact with said internal shoulder one of a plurality of aligned rigidly interconnected plugs of rigid material and having in each thereof through-connector passages in registration with the connector passages in said cores and having core connector patterns on the exposed face thereof in communication with selected ones of the connector patterns on the face of said panel, and forming a continuous coating of conductive material on the face and back connector patterns of said panel and directly in the aligned passages of said cores, plugs and sockets.

References Cited in the file of this patent

UNITED STATES PATENTS

| | | |
|---|---|---|
| 2,752,693 | Wullschleger | July 3, 1956 |
| 2,824,294 | Saltz | Feb. 18, 1958 |
| 2,901,736 | Sylvester | Aug. 25, 1959 |
| 2,970,296 | Horton | Jan. 31, 1961 |

OTHER REFERENCES

Swiggett: Introduction to Printed Circuits, John F. Rider, Rider Publisher, Inc., New York, N.Y., 1956, pages 54–59, and 68.